(12) United States Patent
Wallgren et al.

(10) Patent No.: US 11,167,610 B2
(45) Date of Patent: Nov. 9, 2021

(54) WHEEL SUSPENSION FOR A MOTOR VEHICLE

(71) Applicant: ZF Friedrichshafen AG, Friedrichshafen (DE)

(72) Inventors: Klaus Wallgren, Karlsfeld (DE); Knut Heidsieck, Bünde (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 21 days.

(21) Appl. No.: 16/640,100

(22) PCT Filed: Jul. 16, 2018

(86) PCT No.: PCT/EP2018/069186
§ 371 (c)(1),
(2) Date: Feb. 19, 2020

(87) PCT Pub. No.: WO2019/037947
PCT Pub. Date: Feb. 28, 2019

(65) Prior Publication Data
US 2020/0290418 A1  Sep. 17, 2020

(30) Foreign Application Priority Data
Aug. 22, 2017  (DE) ...................... 10 2017 214 639.7

(51) Int. Cl.
*B60G 7/00* (2006.01)
*B60G 3/20* (2006.01)
*B60G 13/00* (2006.01)

(52) U.S. Cl.
CPC ............... *B60G 3/20* (2013.01); *B60G 7/006* (2013.01); *B60G 7/008* (2013.01); *B60G 13/006* (2013.01);
(Continued)

(58) Field of Classification Search
CPC ............ B60G 2300/50; B60G 2206/12; B60G 2200/184; B60G 2200/18;
(Continued)

(56) References Cited

U.S. PATENT DOCUMENTS

| 8,286,979 B2 | 10/2012 | Schote |
| 2007/0080509 A1* | 4/2007 | Kim ...................... B60G 7/006 280/5.52 |

(Continued)

FOREIGN PATENT DOCUMENTS

| DE | 10 2010 012 014 A1 | 9/2011 |
| DE | 10 2012 011 867 A1 | 1/2013 |

(Continued)

OTHER PUBLICATIONS

Machine translation of WO2007045308A1 description obtained from espacenet.com Apr. 6 (Year: 2021).*

(Continued)

*Primary Examiner* — Paul N Dickson
*Assistant Examiner* — Maxwell L Meshaka
(74) *Attorney, Agent, or Firm* — Finch & Maloney, PLLC; Michael J. Bujold; Jay S. Franklin

(57) ABSTRACT

A wheel suspension (1) for a motor vehicle that has a wheel carrier (2) for holding a wheel (3), a wheel-guiding control arm (4) for the articulated connection of the wheel carrier (2) to a body (6), and steering member (8) for steering the wheel (3). The wheel carrier (2) and the wheel-guiding control arm (4) are directly connected, in a first connection area (20), and indirectly connected, in a second connection area (21), by an integral link (5) so that, relative to the wheel-guiding control arm (4), the wheel carrier (2) can pivot about a steering axis. The wheel suspension is characterized by a chassis element (12) that is articulated on a body side and is directly connected to the wheel carrier (2).

15 Claims, 4 Drawing Sheets

(52) U.S. Cl.
CPC .. *B60G 2200/184* (2013.01); *B60G 2200/422* (2013.01); *B60G 2200/44* (2013.01); *B60G 2202/152* (2013.01); *B60G 2204/129* (2013.01); *B60G 2204/4222* (2013.01); *B60G 2206/011* (2013.01); *B60G 2206/121* (2013.01); *B60G 2206/50* (2013.01); *B60G 2300/50* (2013.01)

(58) Field of Classification Search
CPC ...... B60G 2204/422; B60G 2204/4222; B60G 2206/121; B60G 2200/462; B60G 2200/46; B60G 2200/44; B60G 2200/42; B60G 2206/50; B60G 2200/422; B60G 7/008; B60G 3/20; B60K 7/0007
See application file for complete search history.

(56) References Cited

U.S. PATENT DOCUMENTS

| | | | | |
|---|---|---|---|---|
| 2011/0291379 | A1* | 12/2011 | Yanagida | B60G 7/001 280/124.134 |
| 2015/0183286 | A1* | 7/2015 | Bruehl | B62D 3/02 280/124.135 |
| 2017/0015173 | A1* | 1/2017 | Battaglia | B60G 3/18 |
| 2018/0111432 | A1* | 4/2018 | Drotar | B60G 7/008 |
| 2019/0126702 | A1 | 5/2019 | Hacker et al. | |
| 2020/0282788 | A1* | 9/2020 | Wolf-Monheim | B60G 7/02 |

FOREIGN PATENT DOCUMENTS

| | | | | |
|---|---|---|---|---|
| DE | 10 2015 206 340 | A1 | 10/2016 | |
| DE | 20 2017 100 164 | U1 | 4/2017 | |
| DE | 10 2016 200 096 | A1 | 7/2017 | |
| DE | 102016222965 | A1 * | 5/2018 | ............. B60G 7/008 |
| EP | 1870263 | A2 * | 12/2007 | ............. B60G 7/003 |
| EP | 2251217 | A1 * | 11/2010 | ............. F16F 9/466 |
| EP | 3118032 | A1 * | 1/2017 | ............. B60G 7/02 |
| WO | 2007/045308 | A1 | 4/2007 | |

OTHER PUBLICATIONS

Machine translation of WO2007045308A1 claims obtained from espacenet.com May 10 (Year: 2021).*
Machine translation of DE102016200096A1 description obtained from espacenet.com May 10 (Year: 2021).*
International Search Report Corresponding to PCT/EP2018/069185 dated Jan. 24, 2019.
International Search Report Corresponding to PCT/EP2018/069186 dated Oct. 24, 2018.
Written Opinion Corresponding to PCT/EP2018/069185 dated Jan. 24, 2019.
Written Opinion Corresponding to PCT/EP2018/069186 dated Oct. 24, 2018.

* cited by examiner

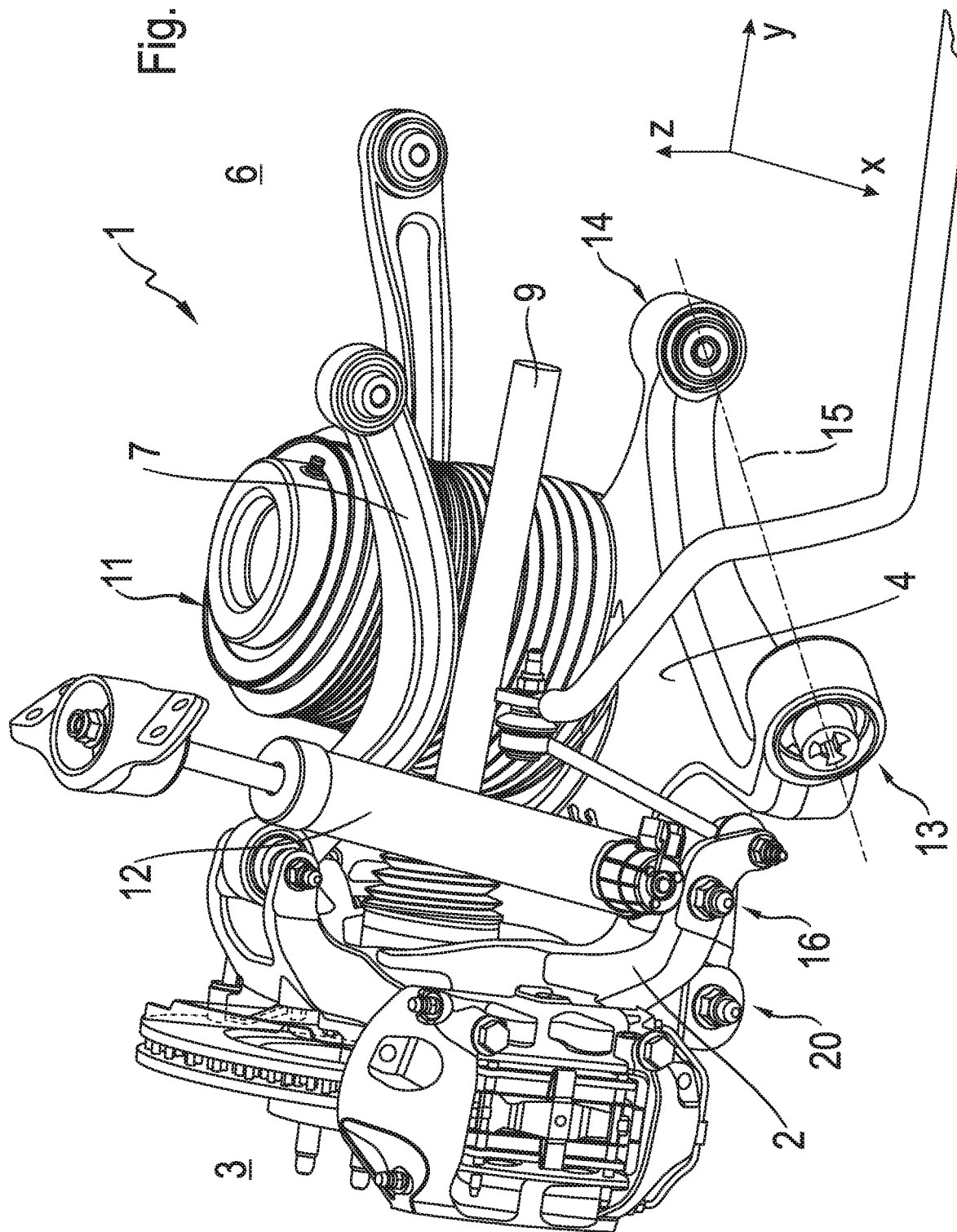

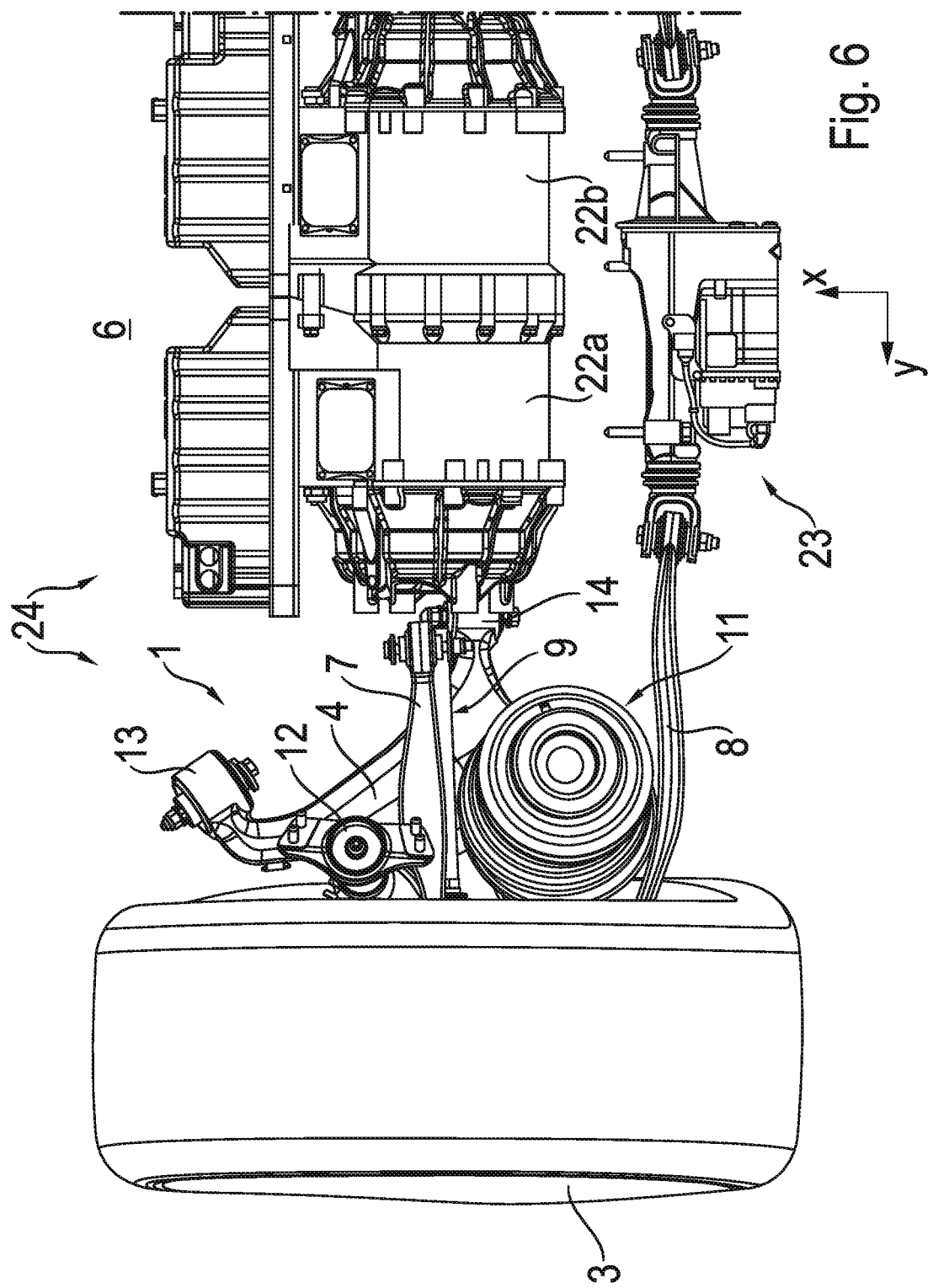

WHEEL SUSPENSION FOR A MOTOR VEHICLE

This application is a National Stage completion of PCT/EP2018/069186 filed Jul. 16, 2018, which claims priority from German patent application serial no. 10 2017 214 639.7 filed Aug. 22, 2017.

FIELD OF THE INVENTION

The present invention relates to a wheel suspension for a motor vehicle.

BACKGROUND OF THE INVENTION

From DE 10 2016 200 096 A1 a wheel suspension for a motor vehicle is known, which can be used in particular for a drivable and steerable rear axle. For this purpose a wheel carrier which holds a wheel that can be driven by a driveshaft is articulated to a wheel-guiding control arm. The wheel-guiding control arm, which consists of a component that extends essentially in the longitudinal direction of the vehicle and, connected thereto, a component that extends essentially in the transverse direction of the vehicle, is articulated to a body of the vehicle by means of two body-side mountings, and can therefore undergo vertical movements in the area on the wheel carrier side.

The term "body" is in the context of this patent application to be interpreted broadly, and in particular covers both the body of the vehicle and also assemblies permanently connected thereto, such as an axle carrier mounted on the body or connection components comparable with that.

In DE 10 2016 200 096 A1 the wheel-guiding control arm and the wheel carrier are articulated to one another by means of a ball joint in such manner that the wheel carrier can pivot relative to the wheel-guiding control arm about a steering axis. The steering axis extends through the ball joint and a further articulation point at the upper end of the wheel carrier, where the wheel carrier is articulated to a camber link which, at its end remote from the wheel carrier, is in turn articulated to the body of the vehicle. The steering axis of the wheel carrier so formed, passing through the lower and upper connection points of the wheel carrier, can vary its position relative to the body of the vehicle depending on the jouncing condition, and is therefore a steering axis with a dynamic position relative to the vehicle body. To enable steering movements of the wheel carrier about the steering axis so formed, a track control arm that extends in the transverse direction of the vehicle engages at a rear end of the wheel carrier. By translational movement of the track control arm in the transverse direction of the vehicle, the wheel carrier is caused to undergo steering movements, i.e. it pivots about the previously described steering axis.

To support the wheel carrier, in particular the drive or deceleration forces or torques that act upon it, the wheel carrier is coupled in a rear area to the wheel-guiding control arm by means of an integral link. For this, a lower end of the integral link is articulated to the wheel-guiding control arm, while an upper end of the integral link is articulated to a rear end of the wheel carrier. When steering movements are carried out, the upper end of the integral link pivots in the transverse direction of the vehicle.

From DE 10 2010 012 014 A1 a further wheel suspension for a motor vehicle is known, which conforms with the preamble of the independent claim(s). This comprises a spring-damper system, which is supported on one side on the wheel-guiding control arm and on the other side on the body of the vehicle, in order in that way to damp operationally induced oscillations of the wheel-guiding control arm. The design of the spring-damper system as an assembled structural unit, as known from the prior art mentioned, takes up comparatively little structural space, at least in the longitudinal direction and in the transverse direction of the vehicle.

For a modular axle, as used in several vehicle variants, a separated configuration with separate spring and damper is to be preferred. For one thing, the loading width and/or the height of the loading space of the vehicle concerned can be increased thereby, and furthermore, by choosing a particular type of spring, a spring behavior matched to the vehicle and sometimes even an adjustable spring behavior can be produced more simply since due to the component separation there are fewer component variants.

SUMMARY OF THE INVENTION

A purpose of the present invention is to indicate a wheel suspension of the type mentioned to begin with, which in relation to the type and arrangement of the spring-damper system, allows greater variability of the vehicle. In particular the wheel suspension should be designed such that it permits the wheel to be driven and steered at the same time, and utilizes any remaining structural space as efficiently as possible for further components, in particular the spring-damper system of the wheel suspension.

The objective is achieved by a wheel suspension having the characteristics specified in the independent claim(s). According to the invention, this is a wheel suspension for a motor vehicle, with a wheel carrier for holding a wheel, a wheel-guiding control arm for the articulated connection of the wheel carrier to a body, a camber link that connects the wheel carrier to the body, and steering means for steering the wheel. The wheel carrier and the wheel-guiding control arm are connected in a first connection area directly and in a second connection area indirectly via an integral link, in such manner that the wheel carrier can pivot relative to the wheel-guiding control arm about a steering axis. According to the invention one distinguishing feature of the wheel suspension is a chassis element articulated on the body side, which is connected directly to the wheel carrier.

The chassis element articulated on the body side and connected directly to the wheel carrier, can quite generally be any functional element related to the wheel suspension, and in particular contributes toward the damping and/or suspension of the wheel relative to the body of the vehicle. Since, in contrast to the wheel suspensions previously known from the prior art, the chassis element is connected directly to the wheel carrier, the wheel suspension described according to the invention has advantages in relation to the utilization of structural space and the kinematic conditions. Thanks to the direct connection between the chassis element and the wheel carrier, an end of the chassis element on the wheel carrier side can be supported at a point located far toward the outside relative to the center of the vehicle, namely particularly close to the wheel. With an appropriate design of the wheel-guiding control arm, this support point can advantageously contribute toward enabling the chassis element connected directly to the wheel carrier and articulated on the body side, which element is preferably a damper, to be operated particularly effectively (directly) since a kinematically induced deflection of the wheel results in comparatively strong compression of the chassis element, in particular the damper ("sensitive response behavior").

As already mentioned above, the chassis element articulated on both sides and connected directly to the wheel carrier, is preferably a damper.

In an advantageous further development of the invention the chassis element, particularly in the form of a damper, is arranged (relative to a longitudinal axis of the vehicle) ahead of the center of the wheel and/or ahead of a driveshaft that drives the wheel. This arrangement brings the advantage that the structural space located behind the center of the wheel and/or behind a driveshaft that drives the wheel is left available for further components of the chassis.

From the standpoint of design, it is advantageous that the connection of the chassis element on the wheel carrier side is located close to the first connection area, in which the wheel carrier and the wheel-guiding control arm are articulated to one another.

Expediently, the two connection areas (the first and second connection areas) are a distance away from one another, especially in the longitudinal direction of the vehicle. Various arrangements and configurations of the connection areas are conceivable. According to a preferred further development of the wheel suspension, one of the two connection areas, in particular the first connection area, is located ahead of the center of the wheel and the other, the second connection area, is behind the center of the wheel. It should be commented that relative to the longitudinal direction of the vehicle, the first connection area can also be located close to or even behind the center of the wheel.

According to an advantageous further development of the wheel suspension, the wheel-guiding control arm has a rotational axis that extends obliquely relative to the longitudinal axis of the vehicle, since the wheel-guiding control arm is connected to the body (of the vehicle) in two areas, specifically a forward, outer area and a rear, inner area. The terms "forward" and "rear", or "outer" and "inner", are understood to relate to the longitudinal direction and the center of the vehicle, respectively. Thus, relative to the longitudinal direction and the center of the vehicle, the forward, outer area is located farther forward and farther out than the rear, inner area. Thanks to the oblique rotational axis of the wheel-guiding control arm, advantages relating to the configuration of the structural space, among others, are obtained.

Advantageously, the wheel suspension has a spring-damper system of separated design, i.e. the spring and the damper are chassis elements structurally separated from one another. The chassis element articulated on the body side, which is connected directly to the wheel carrier, is preferably the damper. A preferred further development of the wheel suspension provides that—parallel thereto—the wheel-guiding control arm is supported against the body of the vehicle by means of a spring that extends essentially in the vertical direction of the vehicle. Accordingly, as elements separate from one another the spring and the damper are each supported on one side against the body, wherein the damper, being connected directly with the wheel carrier, damps the movements of the latter whereas the action of the spring takes place against the wheel-guiding control arm.

The wheel suspension achieves a favorable utilization of structural space in that, advantageously, in relation to a longitudinal direction of the vehicle, the spring is arranged behind the center of the wheel and/or behind a driveshaft that drives the wheel. Speaking generally it is advantageous to position the spring, relative to the center of the wheel and/or a driveshaft that drives the wheel, opposite the damper. When the spring is arranged behind the center of the wheel or behind the associated driveshaft, the particular advantage is obtained that a substantially large structural space (in the longitudinal and transverse directions of the vehicle) is available for the spring. This substantially large structural space permits the use of a particular type of spring, in particular an adjustable spring especially such as a pneumatically or hydraulically adjustable spring. The adjustability of the spring has advantageous effects for the motor vehicle, for example the height level of the motor vehicle can be influenced actively and/or the spring characteristic (spring hardness) can be influenced, so that a desired level of driving comfort and also driving stability can be varied actively. From the technical standpoint, a pneumatically or hydraulically adjustable spring can be used to good advantage. The structural space provided by the separated configuration in particular enables the use of a pneumatically adjustable spring, a so-termed air spring.

In an advantageous design of the wheel suspension, it has a spring ratio of between 0.5 and 1, preferably around 0.7. The spring ratio is understood to mean the ratio between the distance of the spring from the rotational axis (of the wheel-guiding control arm) and the distance of the wheel from the rotational axis. Decisive for the value of the ratio (spring ratio) is the oblique positioning of the rotational axis of the wheel-guiding control arm relative to the longitudinal direction of the vehicle. Due to the oblique positioning, it is advantageously possible to use the wheel-guiding control arm to obtain a comparatively large spring ratio, despite the small structural width in the transverse direction of the vehicle.

The wheel suspension of the type described above can be designed in various ways. According to a preferred further development, relative to a vertical direction of the vehicle the wheel-guiding control arm is arranged in a lower control-arm plane and the wheel carrier with the camber link supporting it on the body is arranged in a higher control-arm plane.

An advantageous structural space configuration is obtained if the integral link is arranged essentially inside the wheel.

Preferably, the integral link is articulated to the wheel-guiding control arm at a first connection point and to the wheel carrier at a second connection point.

An advantageous use of structural space is achieved if, in the unsteered condition of the wheel, the integral link is oriented essentially in the vertical direction of the vehicle.

Advantageously, the wheel suspension is suitable for the wheel to be driven by a shaft that extends essentially in the transverse direction of the vehicle. The shaft preferably extends between the spring and the chassis element, relative to the longitudinal direction of the vehicle. It should be stressed that although the wheel suspension is advantageously suitable for the wheel to be driven, it does not, however, have to be designed so as to allow driving of the wheel. The features of the wheel suspension described in the context of the invention are just as suitable for a driven wheel as for a wheel that is not driven.

BRIEF DESCRIPTION OF THE DRAWINGS

Below, the invention be described with reference to an example embodiment illustrated in the drawings, which show:

FIG. 5: A wheel suspension (on the right) for a motor vehicle, viewed in perspective from the front, FIG. 6: A (left-hand) part of a vehicle axle with a central drive unit and a wheel suspension, seen from above.

DETAILED DESCRIPTION OF THE PREFERRED EMBODIMENTS

Figure 3:
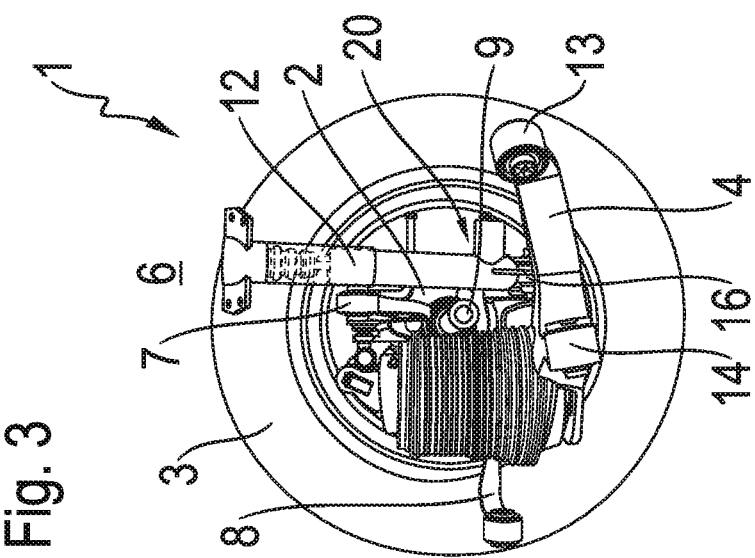
FIG. 3: The wheel suspension according to FIGS. 1 and 2, viewed from the center of the vehicle.

FIGS. 1 to 5 in the attached drawings relate to a wheel suspension according to a preferred example embodiment of the invention. Since all of FIGS. 1 to 5 relate to the same example embodiment, the same components in the various representations are given the same indexes. Thus, explanations already given about individual components or in relation to the interactions and function of the wheel suspension apply to all the FIGS. 1 to 5. Accordingly, to avoid repetition reference should be made to the whole of the description of the example embodiment.

For orientation purposes each of FIGS. 1 to 4 contains a co-ordinate system which, in each of the figures, specifies at least two of the following directions: the vehicle longitudinal direction x, the vehicle transverse direction y and the vehicle vertical direction z. The vehicle longitudinal direction x corresponds to the forward-driving direction of the vehicle.

FIGS. 1 to 4 show a wheel suspension 1 for a motor vehicle, according to a first and only example embodiment of the present invention, viewed from various perspectives. Specifically, the wheel suspension is one for a rear wheel of a passenger vehicle.

For this, a wheel 3 is held by a wheel carrier 2 and is mounted by the latter to rotate about a wheel axis (not identified in greater detail). The wheel suspension 1 additionally comprises a wheel-guiding control arm 4 for the articulated connection of the wheel carrier 2 to a vehicle body 6. The vehicle body 6 (not shown, for representational reasons) can be the body itself or a so-termed axle carrier which can be fixedly mounted on the body of the vehicle. In the context of this patent application the term "body" should therefore be interpreted broadly, and in particular covers both the body of the vehicle and assemblies fixedly connected thereto, such as an axle carrier mounted on the body, or comparable connection components.

Figure 4:
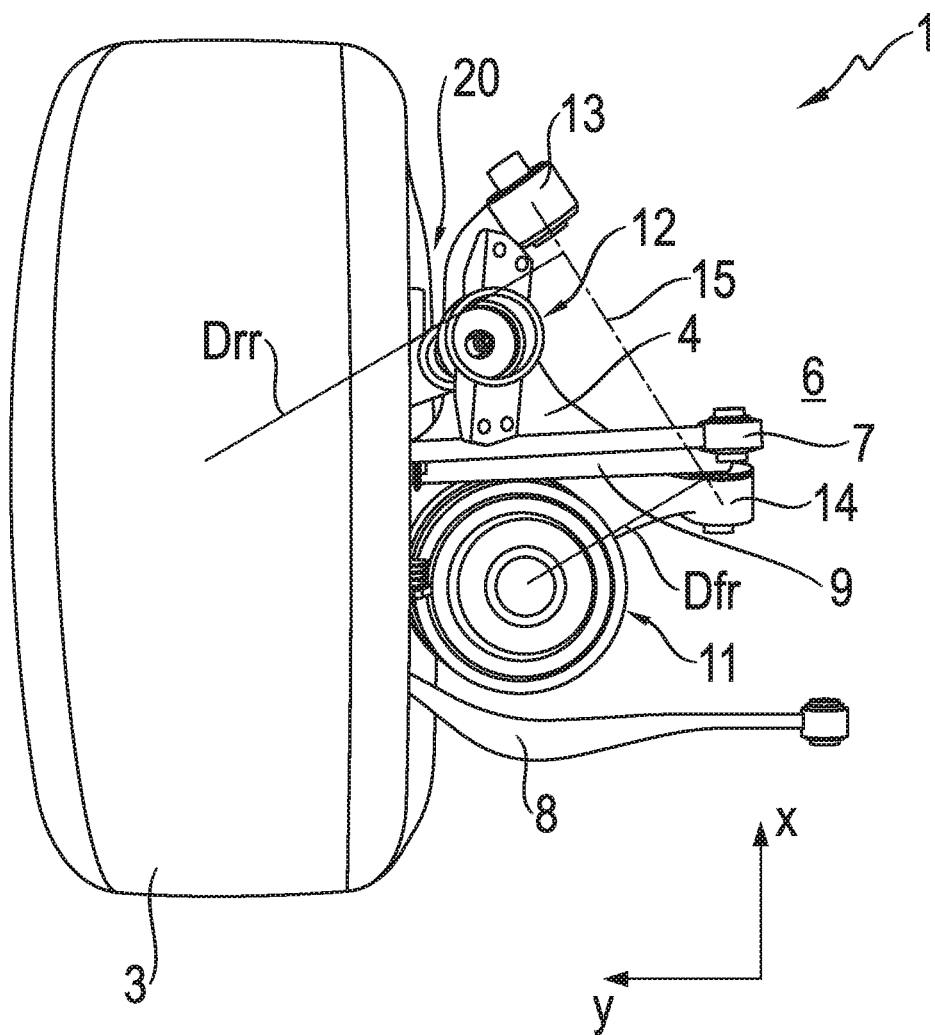
FIG. 4: The wheel suspension viewed as in FIG. 2, with aid lines to clarify the spring ratio.

The wheel-guiding control arm is a one-piece, approximately trapezium-shaped component which has a forward, body-side mounting 13 and a rear, body-side mounting 14, such that by virtue of the mountings 13, 14 the wheel-guiding control arm 4 is able to pivot relative to the body 6 in such manner that the wheel-guiding control arm 4 can pivot relative to the body 6 about a rotational axis 15 (see FIG. 4). As can be seen in the representation according to FIG. 4 (a view from above), the rotational axis 15 is oblique relative to the longitudinal axis x of the vehicle, the obliquity amounting to between 10° and 45°. Due to this obliquity relative to the longitudinal axis x of the vehicle, the wheel-guiding control arm 4 can also be called an "oblique control arm"—as opposed to a transverse control arm.

Figure 2:
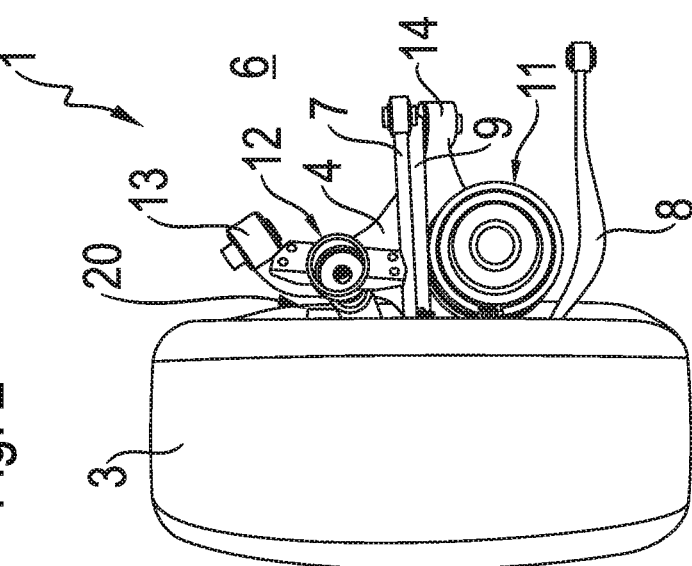
FIG. 2: The wheel suspension of FIG. 1, viewed from above.

The wheel-guiding control arm 4 is connected to the wheel carrier 2 in a particular way. In a first connection area 20, the wheel carrier is connected directly to the wheel-guiding control arm 4 by means of a ball joint. Relative to the longitudinal direction x of the vehicle this first connection area 20, indicated by arrows in FIGS. 2, 3 and 4, is ahead of the center of the wheel 3. Furthermore, in a second connection area 21 (see FIG. 1) the wheel carrier 2 is connected to the wheel-guiding control arm 4 indirectly, by way of an integral link 5. The integral link 5 is a two-point link whose lower end is articulated at a first connection point 17 to the wheel-guiding control arm 4. An upper end of the integral link 5 is articulated to the wheel carrier 2 at a second connection point 18. The wheel carrier 2 holding the wheel 3 is thus connected to the wheel-guiding control arm 4 or coupled thereto in a particular way, to be explained below.

Figure 1:
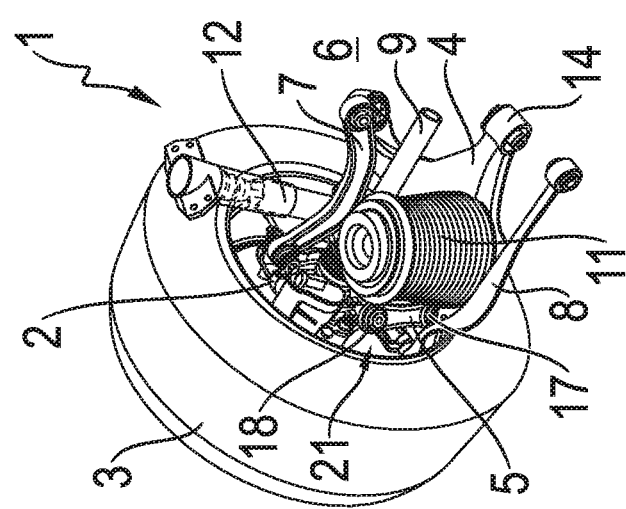
FIG. 1: A wheel suspension (on the left) for a motor vehicle, according to an example embodiment of the invention, viewed in perspective obliquely from the rear.

To enable the wheel 3 to be steered, the wheel carrier 2 can pivot relative to the wheel-guiding control arm 4 about a steering axis. In this case the connection between the wheel carrier 2 and the wheel-guiding control arm 4 by way of the first connection area 20 and the second connection area 21 is in a lower control arm plane. To set the camber angle of the wheel 3, the wheel suspension 1 also comprises a camber link 7 which, by contrast, is arranged in an upper control arm plane. The camber link 7, which can best be seen in FIG. 1, is an approximately c-shaped component which extends essentially in the transverse direction y of the vehicle. On its body side the camber link 7 is articulated to the body 6, while on its wheel carrier side the camber link 7 is connected to an arm of the wheel carrier 2 that projects obliquely forward. In this way the wheel carrier 2 is connected to the body 6 in the lower control arm plane by means of the wheel-guiding control arm 4 and in the upper control arm plane by means of the camber link 7. Thereby, the wheel carrier 2 can pivot about a steering axis which extends through the first connection area 20 at a joint that connects the camber link 7 to the wheel carrier 2. Depending on the jouncing condition of the wheel-guiding control arm 4, the steering axis so formed (through the points described) can change its relative position with respect to the body 6 of the vehicle.

To support the torques acting upon the wheel carrier 2 about the rotational axis of the wheel 3, the wheel carrier 2—in addition to its direct connection in the first connection area 20—is indirectly coupled in the second connection area 21 to the wheel-guiding control arm 4. This indirect connection takes place by means of the integral link 5 already described. In the unsteered condition of the wheel 3, the integral link 5 is oriented essentially in the vertical direction z of the vehicle, as can be seen in FIG. 1. By way of the upper connection 18 the integral link 5 is articulated to an arm of the wheel carrier 2 that projects rearward, whereas it is articulated by the lower connection 17 to the wheel-guiding control arm 4 in the rear area of the latter.

To steer the wheel 3 the wheel carrier 2, as can be seen for example in FIGS. 1 and 2, is articulated with a rearward-projecting arm to an end of a track control arm 8 on the wheel carrier side. The track control arm 8 is an elongated component that extends essentially in the transverse direction y of the vehicle. To bring about active steering of the wheel 3, the track control arm 8 can be connected to a steering adjuster (actuator, not shown) arranged on the body 6. To carry out active steering movements, by means of the steering actuator the track control arm 8 is then moved in the transverse direction y of the vehicle, so that the transverse movement is transmitted via the track control arm 8 to the rear area of the wheel carrier 2. As a result of this transverse movement, the wheel carrier 2 pivots about its previously described steering axis.

It should be mentioned that the wheel suspension can alternatively be equipped with passive steering. In that case the steering means provided is in each case in the form of a track control arm. On the wheel carrier side such a track control arm is likewise connected to a rearward-projecting arm of the wheel carrier (as in the case of active steering of the track control arm 8). Similarly to the track control arm of an active steering system, the track control arm here is also an elongated component that extends essentially in the transverse direction of the vehicle with an articulated connection on the body side to the vehicle. In this case there is no need for a steering adjuster (actuator) since in the case of passive steering the influence is exerted exclusively by way of the wheel stroke.

The wheel suspension 1 is provided with a spring-damper system. In the example embodiment according to the invention shown in FIGS. 1 to 4, the spring-damper system of the wheel suspension 1 has a separated structure, that is to say, a spring 11 and a damper 12 are arranged apart as components separated from one another. The damper 12 is an elongated component oriented essentially in the vertical direction z of the vehicle. An upper end of the damper 12 is connected to the body 6 of the vehicle, while a lower end of the damper 12 is connected directly to the wheel carrier 2 by means of a damper mounting 16 (see FIG. 3). Thus, the damper 12 is arranged so that it follows all the vertical jouncing movements of the wheel carrier 2 by compression or extension, and damps those movements. Due to the direct connection with the wheel carrier 2, the stroke movements of the wheel carrier 2 are transmitted to the damper 12 directly, i.e. without interposition of any other chassis components. As can be seen in FIG. 2 or 3, relative to the longitudinal direction x of the vehicle, the damper 12 is positioned ahead of the center of the wheel 3 and at the same time ahead of a driveshaft 9 that drives the wheel 3. The wheel-carrier-side connection of the damper 12 to the wheel carrier 2 is located close to the first connection area 20, in which the wheel carrier 2 is articulated directly (by means of a ball joint) to the wheel-guiding control arm 4.

In addition the wheel suspension 1 comprises the spring 11, which in the example embodiment illustrated is in the form of an air spring. In contrast to the damper 12, relative to the longitudinal direction x of the vehicle, the spring 11 is arranged behind the center of the wheel 3 and at the same time behind the driveshaft 9 that drives the wheel 3, as can be seen for example in FIGS. 2 and 3. A lower end of the spring 11 is in contact with the wheel-guiding control arm 4. An upper end of the spring 11—relative to the vertical direction z of the vehicle—is supported against the body 6 of the vehicle. Thus, the spring 11 is arranged between the wheel-guiding control arm 4 and the body 6, and acts between them. When the wheel 3 is deflected the lower end of the spring 11 is raised by the wheel-guiding control arm 4, which is connected to the wheel carrier 2, in the direction toward the body 6 (in the vertical direction z of the vehicle). Thus the spring 11 is compressed and develops a restoring force that increases with increasing compression, which force counteracts the deflection.

In that the damper 12 is arranged ahead of the center of the wheel and ahead of the driveshaft 9, a comparatively large structural space is available for the spring 11, which—referring to the representation in FIG. 2—is delimited in the longitudinal direction x of the vehicle in the forward direction by the driveshaft 9 or the camber link 7 and in the backward direction by the track control arm 8. This relatively large structural space for the spring 11 makes it possible for the spring 11 to be made as an air spring which has adjustable spring characteristic. It should be mentioned that the advantages of the invention can also be achieved with a spring that is not adjustable. However, an adjustable spring has advantages in relation to comfort and adaptability to differing operating situations. For example, with an air spring the height of the vehicle can be adjusted by varying the air pressure in the spring bellows.

It has already been mentioned that the wheel-guiding control arm 4 has a rotational axis 15 that extends obliquely relative to the longitudinal axis x of the vehicle, as can be seen particularly in FIG. 4. Due to the obliquity and the arrangement of the spring 11 and damper 12 chosen in the example embodiment shown, the wheel suspension 1 has good efficiency in relation to the spring 11. For explanatory purposes three aid lines are shown in FIG. 4. There is, first the rotational axis 15 that extends between the forward mounting 13 and the rear mounting 14 of the wheel-guiding control arm 4. A distance Dfr from the spring 11 to the rotational axis 15 and a distance Drr from the wheel 3 to the rotational axis 15 are shown as further auxiliary lines. The spring ratio of the spring 11 is obtained from a comparison of the lengths of the two distances (spring 11 and wheel 3, in each case from the rotational axis 15). In the example embodiment shown, the value of this spring ratio is around 0.7. In light of the comparatively compact structure of the wheel suspension 1, in particular due to the comparatively short length of the control arm components used, this is a relatively high value.

Due to the direct connection of the damper 12 to the wheel carrier 2 formed according to the invention, in a comparable manner a favorable efficacy is also achieved for the damper 12. By virtue of the forward and rear arrangement of the damper 12 and spring 11 (ahead of and behind the driveshaft 9), the wheel suspension 1 makes good use of the structural space available.

For clarification purposes FIG. 6 shows part of a vehicle axle 24, viewed from above. The vehicle axle 24 comprises as its essential constituents a central drive unit 22a, 22b and two wheel suspensions 1, of which for representational reasons only the one on the left in relation to the longitudinal direction x of the vehicle can be seen. The (left) wheel suspension 1 shown corresponds structurally and with regard to the indexing to the wheel suspension 1 described with reference to FIGS. 1 to 5, for which reason repeated explanations about it can be avoided by referring to those given there.

As already mentioned, the vehicle axle 24 comprises a centrally arranged drive unit 22a, 22b. In the example embodiment shown the drive unit comprises two electric drive motors such that the drive unit is divided into a left-hand part 22a and a right-hand part 22b (in each case relative to the longitudinal direction x of the vehicle). The left-hand part 22a is located to the left of the center of the vehicle and can be brought into driving connection by way of the driveshaft 9 with the wheel 3 of the left-hand wheel suspension 1 (which is shown). The right-hand part 22b is to the right of the center of the vehicle and can likewise be brought into driving connection via a driveshaft (not shown) with a wheel of a right-hand wheel suspension (not shown). The components belonging to the right-hand side of the vehicle correspond in their structure and function to those on the left-hand side of the vehicle (shown), but are designed and arranged in mirror-image relationship thereto.

Since the wheel on each side of the vehicle can be driven by a drive unit 22a (left) or 22b (right) of its own, the drive torque transmitted to the wheels can be influenced individually (so-termed "torque vectoring"), which allows better driving properties to be obtained in differing driving situations.

The representation in FIG. 6 shows that the drive unit 22a, 22b occupies a considerable structural width in the transverse direction y of the vehicle. The vehicle axle 24 is so designed that despite this structural width, it has a wheel suspension 1 on each side, which enables a wheel to be driven, which can be steered, and which meets strict drive-dynamical demands. This is in particular enabled because in relation to the transverse direction y of the vehicle all the connection areas 13, 14 of the lower wheel-guiding control arm 4 are positioned outside the centrally arranged drive unit 22. So that at the same time the vehicle axle will provide a high level of sprung comfort, the lower wheel-guiding control arm 4 can be connected to the body 6 in a forward (outer) area 13 and in a rear (by contrast, inner) area 14, and has a rotational axis extending obliquely relative to the longitudinal direction x of the vehicle. Thanks to the obliquely extending rotational axis, the advantages already explained earlier in the description, relating to the ratios for the spring 11 and the damper 12, are obtained.

It can also be seen in FIG. 6 that the vehicle axle 24 is equipped with active steering. For this, the end of the track control arm 8 remote from the wheel 3 of the left-hand wheel suspension 1 is connected to a steering actuator 23, which is arranged centrally behind the drive unit 22a, 22b on the body side. The steering actuator 23 comprises an electric actuator and is designed to move the end of the track control arm 8 connected to it, in translation (in the transverse direction y of the vehicle) in order to produce a steering movement of the wheel 3. The steering actuator 23 is a so-called central actuator, which means that a steering link of the right wheel suspension (not fully shown in FIG. 6) is connected to the steering actuator 23 in a similar manner. Thus, actuation of the steering actuator 23 brings about steering movement of the wheel suspension 1 on the left and at the same time such movement on the right.

INDEXES

1 Wheel suspension
2 Wheel carrier
3 Wheel
4 Wheel-guiding control arm
5 Integral link
6 Body
7 Camber link
8 Track control arm
9 Driveshaft
11 Air spring
12 Damper
13 Forward mounting
14 Rear mounting
15 Rotational axis
16 Damper mounting
17 First connection to the integral link
18 Second connection to the integral link
20 First connection area
21 Second connection area
22a Electric drive unit (left-hand part)
22b Electric drive unit (right-hand part)
23 Steering actuator
24 Vehicle axle
Dfr Distance from spring to rotational axis
Drr Distance from wheel to rotational axis
x Longitudinal direction of the vehicle
y Transverse direction of the vehicle
z Vertical direction of the vehicle

The invention claimed is:

1. A wheel suspension for a motor vehicle, the wheel suspension comprising:

a wheel carrier for holding a wheel,
a wheel-guiding control arm for articulated connection of the wheel carrier to a body,
a camber link that connects the wheel carrier to the body, and
steering means for steering the wheel,
the wheel carrier and the wheel-guiding control arm being connected directly, in a first connection area, and indirectly connected, in a second connection area, by an integral link such that the wheel carrier is pivotable about a steering axis relative to the wheel-guiding control arm, and
a chassis element being articulated on a body side, which is directly connected to the wheel carrier, the chassis element being directly connected to the wheel carrier by a wheel-carrier-side connection, and the wheel-carrier-side connection of the chassis element is vertically below at least one of a center of the wheel and a driveshaft that drives the wheel; and the chassis element, relative to a longitudinal direction of the vehicle, is arranged ahead of at least one of the center of the wheel and the driveshaft that drives the wheel.

2. The wheel suspension according to claim 1, wherein the chassis element is a damper.

3. The wheel suspension according to claim 1, wherein the wheel-carrier-side connection of the chassis element, relative to the wheel carrier, is arranged adjacent to the first connection area.

4. The wheel suspension according to claim 1, wherein the first connection area, relative to a longitudinal direction of the vehicle, is ahead of the center of the wheel and the second connection area is behind the center of the wheel.

5. The wheel suspension according to claim 1, wherein the wheel-guiding control arm has a rotational axis that extends obliquely relative to a longitudinal axis of the vehicle, and the wheel-guiding control arm is connected to the body in a forward outer area and a rearward inner area.

6. The wheel suspension according to claim 1, wherein the wheel-guiding control arm is supported against the body by a spring that extends substantially in a vertical direction of the vehicle, a lower end of the spring is in contact with the wheel-guiding control arm vertically below the center of the wheel.

7. The wheel suspension according to claim 6, wherein the spring is arranged, relative to a longitudinal direction of the vehicle, behind at least one of the center of the wheel and the driveshaft that drives the wheel.

8. The wheel suspension according to claim 6, wherein the spring has a spring ratio of between 0.5 and 1, and the spring ratio is defined as the ratio between a distance of the spring from a rotational axis of the wheel-guiding control arm and a distance of the wheel from the rotational axis of the wheel-guiding control arm.

9. The wheel suspension according to claim 6, wherein the spring is either a pneumatically or a hydraulically adjustable spring.

10. The wheel suspension according to claim 1, wherein the wheel is drivable by the driveshaft that extends substantially in a transverse direction of the vehicle, and the driveshaft, relative to a longitudinal direction of the vehicle, extends between the spring and the chassis element.

11. The wheel suspension according to claim 1, wherein the wheel-guiding control arm is arranged, relative to a vertical direction of the vehicle, in a lower control arm plane and the camber link that connects the wheel carrier to the body is arranged in a higher control arm plane.

12. The wheel suspension according to claim 1, wherein the integral link is arranged substantially inside the wheel and, relative to a longitudinal direction of the vehicle, is behind the center of the wheel.

13. The wheel suspension according to claim 1, wherein in an unsteered condition of the wheel, the integral link is oriented substantially in a vertical direction of the vehicle and is arranged, relative to a longitudinal direction of the vehicle, behind the center of the wheel.

14. The wheel suspension according to claim 1, wherein the integral link, at a first connection, is articulated to the wheel-guiding control arm, and the integral link, at a second connection, is articulated to the wheel carrier.

15. A wheel suspension for a motor vehicle, the wheel suspension comprising: a wheel carrier having a wheel mounted thereon; a wheel-guiding control arm articulatably connecting the wheel carrier to a body of the vehicle, the wheel-guiding control arm being directly connected to the wheel carrier, in a first connection area, and being connected, via an integral link, to the wheel carrier, in a second connection area, such that the wheel carrier being pivotable about a steering axis relative to the wheel-guiding control arm; a camber link having one end connected to the wheel carrier and another end connected to the body of the vehicle; steering arm being pivotally connected to the wheel carrier and a steering actuator for steering the wheel; and a chassis element, for damping vertical movement of the wheel carrier relative to the body of the vehicle, being articulated on a body side and the chassis element being directly connected, via a direct connection, to the wheel carrier, the direct connection being vertically lower than a center of the wheel; and the chassis element, relative to a longitudinal direction of the vehicle, is arranged ahead of at least one of the center of the wheel and the driveshaft that drives the wheel.

* * * * *